United States Patent Office 3,778,302
Patented Dec. 11, 1973

3,778,302
CERTAIN PERMEABLE MATERIALS IMPREGNATED WITH A POLYURETHANE POLYMER
Rolf Dahl, West Columbia, S.C., assignor to Continental Tapes, Incorporated, Columbia, S.C.
No Drawing. Application Mar. 30, 1970, Ser. No. 23,983, now Patent No. 3,702,781, which is a continuation-in-part of abandoned application Ser. No. 297,190, July 24, 1963. Divided and this application Mar. 16, 1972, Ser. No. 235,398
Int. Cl. C09j 7/04
U.S. Cl. 117—122 PB      9 Claims

ABSTRACT OF THE DISCLOSURE

Permeable materials containing "active" hydrogen, such as paper, are markedly improved in dry and wet tensile strengths and delamination resistance without loss of flexibility, by impregnation with certain polyurethane polymers.

---

This application is a continuation-in-part of my copending application, Ser. No. 297,190, filed July 24, 1963 for Method of Impregnating Certain Permeable Materials and now abandoned, and this is a division of my copending application Ser. No. 23,983, filed Mar. 30, 1970 and now U.S. Pat. No. 3,702,781, issued Oct. 10, 1972.

This invention relates to new and useful methods of improving the properties of certain permeable materials by impregnating them with urethane polymers. For example, such impregnation of paper greatly improves the dry and wet tensile strengths and the resistance to delamination while still maintaining flexibility; thus yielding a product useful for many purposes including gaskets, coated abrasives, artificial leather, shoe liners, release liners for adhesives, backing for gummed tape and especially for pressure-sensitive adhesive tape backing.

Previous methods of impregnating paper for the uses mentioned comprise saturating with a natural or synthetic ruber latex or solvent solution; but special types of rubber are used and the attachment of the rubber to the paper is so poor that when the latex or solution is dried in the paper the rubber creeps to the surface unless special means are used to coagulate the rubber in the pores of the paper. Even at best a higher pickup in the paper is required than with the methods of the present invention and wet strengths and resistance to delamination, to high temperatures and to solvents are still inferior. Furthermore the present invention permits a much wider range of control of the properties of the impregnated material.

The present method comprises impregnating the paper or other permeable material, herein sometimes called the substrate, with a solution of a particular type of polyurethane polymer containing reactive or terminal isocyanate groups (—N=C=O). It is discovered that while a very large (high molecular weight) polymer may be suitable as a coating material, it may be too large to thoroughly penetrate the substrate and if the polymer is of too low molecular weight the product may be too stiff or inflexible. It is herein disclosed, however, that with a polymer of proper size and containing reactive or terminal isocyanate groups it will be firmly affixed to the paper through reaction of these groups with the hydroxyl groups of the paper to form a urethane linkage. Such fixation is possible with any substrate containing "active" hydrogen, where the presence of active hydrogen is defined by the Zerewitinoff method (Berichte 40, 2023 (1970); 41, 2236 (1908): Kohler, J. Amer. Chem. Soc. 49, 3181 (1927)). Materials containing active hydrogen are those containing hydroxyl, amino, carboxyl and certain other groups and include cellulose, cellulose esters and ethers, polyvinyl alcohol, partially hydrolyzed polyvinyl esters, alkyd resins, gelatin, casein, leather, gelled vegetable oils, etc.

Formation of polyurethane polymers by reaction of organic isocyanates and their use in yielding hard, abrasion-resistant coatings are shown, for example, in U.S. Pat. No. 3,012,987 and some of the chemistry and general applications of polyurethane polymers are shown in "Polyurethanes" by B. A. Dombrow, Reinhold Publishing Co., New York, N.Y. (1957); "The Chemistry of the Organic Isocyanates," Chemical Reviews, 43, 203–18 (1948); and "Urethane Plastics," Ind. Eng. Chem., 48, 1383–91. The present invention, however, resides in the discovery of methods by which polyurethane polymers may be used to substantially uniformly impregnate and thereby substantially improve the properties of certain permeable materials as stated.

For example, masking tape usually uses a paper backing because it is cheap and can be treated to better adapt it for the purpose, by saturating or impregnating it to at least partially fill up the pores. The impregnating material should be solvent resistant since the adhesive mass is often applied in a solvent solution and since paint or lacquer sprayed over its surface often contains solvent. The backing should also be strong when wet in order to stand up in contact with water-based or latex paints— and untreated paper has little or no wet strength. The impregnant should also be able to withstand the high temperatures in baking or drying ovens—and rubber is not so very resistant. Finally, the backing should resist delamination or splitting so that the tape may be cleanly removed from a surface to which it has been attached, even under the considerable force required to remove a highly adherent mass—as a matter of fact the adhesion level of the mass has in the past had to be limited by the delamination resistance of the backing. In order to use the impregnated paper of this invention as a backing for pressure-sensitive adhesive tape, the following procedures are used. For example, a thin release coating may be applied (in a suitable solvent which is subsequently evaporated) to one side of a strip of the impregnated paper (although it has been discovered that the usual pressure-sensitive adhesives do not strongly adhere to the product of the present invention and it can thus be used as a release coating, liner or backing especially when a smooth paper is used as substrate). However, if needed or desired a release coating comprising certain types of vinyl resin such as vinyl stearate or maleic or acrylic anhydride or mixtures of these may be used. To the opposite side of the strip, there is normally applied (in aqueous emulsion and subsequently dried) a thin tie-coat or anchor-coat in order to strongly adhere the film of adhesive to the backing. Such tie-coat may be, for example, an emulsion or dispersion of neoprene or butadiene-styrene rubber and a tackifying resin, stabilized with ammonium caseinate. To the dried tie-coat is applied (either in solution from which the solvent is subsequently dried out, or by calendering) the pressure-sensitive adhesive which is normally a mixture of natural or synthetic rubber with tackifying resin, softener, antioxidant and filler. The adhesive may also contain a proportion of butadiene-styrene rubber and/or phenolic resin and/or a small amount of rubber curing agent to firm up the adhesive mass, especially when it is to be used at higher temperatures.

Urethane polymers are formed by reaction of polyfunctional, active-hydrogen containing organic compounds mainly, for example, polyhydroxy compounds or polyols) and organic polyisocyanates. The following examples illustrate but do not limit my methods and products:

EXAMPLE 1

230 lbs. of a polyether triol of molecular weight 1500 (made by Union Carbide Chemicals Co., New York, N.Y., and known as Niax Triol LHT 112), 58 lbs. of a polyether triol of molecular weight 2500 (made by the same company and known as Niax Triol LHT 67) and 85 lbs. of commercial tolylene diisocyanate (containing 80 wt. percent 2,4 and 20 wt. percent 2,6 isomers and sometimes designated herein as TDI) were dissolved in 113 lbs. heptane and 264 lbs. toluene. This solution was heated at about 180 to 200° F., in a jacketed mixer for about 1 hour, cooled and held for 16 hrs. at 80° F., at which point analysis (see, for example, Dombrow, loc. cit., p. 171) determined that essentially all the OH groups in the triols had reacted with isocyanate. Three lbs. stannous octoate (made by Metal and Thermit Corp., Carteret, N.J., and known as Catalyst T-9) were mixed into the solution. (In order to decrease cost there may be added to the triols at the start of the procedure up to about 100 lbs.—about 25 wt. percent of the pre-polymers—of a resin of low acid number, acid number being the weight in milligrams of KOH equivalent to the acid in 1 gram resin, preferably below about 4, plus additional isocyanate equivalent to the active hydrogen content of the resin, if any. Suitable resins are those made by polymerizing unsaturated petroleum hydrocarbon residues, such as Neville Resin LX 1050, melting point 100° C., made by Neville Chemical Co., Clairton, Pa.; terpene or cumarone-indene resins. Otherwise there may be added up to about 25 wt. percent of the pre-polymers, of a neutral or slightly acid solid filler such as silica like Santocel made by Monsanto Chemical Co., St. Louis, Mo., or hydrophobic aluminum silicate or lampblack. Of course such use of resin or filler extenders are at the expense of some loss of properties of the final product.) A sheet of paper from a roll was then passed through the solution and then through squeeze rolls to remove excess solution and provide for about 50% increase in weight of the final, solvent-free, impregnated paper. From the squeeze rolls the impregnated or "saturated" paper was passed through a warm-air oven or drier at a temperature of from about 125° F. at the start to about 350° F. at the end. The total time in the oven was 1½ to 3 minutes. After most of the solvent had been evaporated, toward the end of the drying period, steam may be introduced in amount below that which results in condensation upon the paper in order to destroy any residual isocyanate groups, but in general this is not necessary if the heating has been adequate, and the final product is essentially tack-free. The product showed good flexibility, markedly increased wet and dry strengths, increased delamination resistance and good solvent and temperature resistance.

EXAMPLE 2

A triol of 3000 molecular weight (Niax Triol LG 56) was reacted with TDI in the proportion of a 1 mol triol to 3 mols diisocyanate, at 200° F. for 2 hrs. This reaction was in 50 wt. percent solution in toluene. The solution was kept at 80° F. for 24 hrs. without appreciable change in viscosity. Then 1 wt. percent of stannous octoate, based on total weight of pre-polymer, was added and untreated paper was saturated with this solution as in Example 1. The finished paper was flexible, free of tack, had increased in weight 45% and in delamination resistance from 6 to 40 ounces per inch of width, in dry tensile from 9 to 27 lb./in. and in wet tensile from 0 to 18 lb./in.

EXAMPLE 3

A pre-polymer was made as in Example 2 but using, in place of the Niax Triol LG 56, an addition compound (adduct) of propylene oxide and 1,2,6 hexane triol of mol. wt. 1500 (Niax Triol LHT 112), reacted with 3 mols TDI to 1 mol adduct. Paper was treated as in Example 1 with a 45 wt. percent solution of this pre-polymer in toluene. The final, dry paper was free of tack and had increased in weight by 49% and in delamination resistance from 6 to 45 oz./in., in dry tensile from 9 to 29 lb./in. and in wet tensile from 0 to 19 lb./in.

EXAMPLE 4

The procedure of Example 3 was carried out except for substitution of glycerol for the adduct. The product was very stiff.

EXAMPLE 5

One mol of a step-addition product of propylene oxide and dipropylene glycol of 2000 molecular weight (Niax Diol PPG 2025) was reacted with 2 mols TDI in 50 wt. percent solution in toluene, as before. Catalyst was added as before and paper was treated with this solution as before. The pickup was 40%. Delamination resistance had increased from 6 to 40 oz./in., dry tensile from 9 to 27 and wet tensile from 0 to 18 lb./in.

EXAMPLE 6

Pre-polymer was made as before in 40 wt. percent solution in toluene, using 114 lbs. of diol of molecular weight 2000 (Niax Diol PPG 2025), 690 lbs. of a triol of molecular weight 4400 (Niax Triol LHT 42), 431 lbs. of a triol of molecular weight 2500 (average mol. wt. of the mixture, about 3300) and 200 lbs. TDI. Paper was treated with this solution and catalyst as before. Delamination resistance had increased from 6 to 45 oz./in., dry tensile from 9 to 33 and wet tensile from 0 to 19 lb./in. The pickup ws 60%.

EXAMPLE 7

Pre-polymer was made as before in 60% solution in toluene, but using 44 lbs. of triol of 4400 mol. wt. (Niax Triol LHT 42), 6 lbs. of a diol of mol. wt. 600 (Carbowax 600, made by Union Carbide Chemicals Co.), 10 lbs. polymerized unsaturated petroleum hydrocarbon residues (Neville Resin LX 1050) and 8.7 lbs. TDI. Paper treated with this solution and catalyst as before, showed a 55% pickup and increased in delamination resistance from 6 to 35 oz./in., dry tensile from 9 to 25 and wet tensile from 0 to 18 lb./in.

EXAMPLE 8

Pre-polymer was made as before but using 1 mol of a triol of 4400 mol. wt. with 3 mols TDI in 50% solution in toluene. Paper treated as before but with this solution was very gummy and soft.

The tensile strength measurements given above were determined in the usual manner on 1 in. wide strips, using, for example, a "Scott Tester" on either dry or, in the case of wet tensile, on strips soaked in water at room temperature. Delamination resistance is determined by firmly adhering "pull strips" to the opposite surfaces of the end of the 1-inch strip, starting the splitting and measuring the force required to continue the splitting.

Examples 1, 2, 3, 5, 6 and 7 show the highly desirable properties of the product when polyol and polyol mixtures of proper molecular weights are used in the methods of this invention. Example 4 shows that the use of polyhydroxy compounds of too low molecular weight yields products too stiff. This is the only example cited above that is thus unsatisfactory. If the polymer is of too low mol. wt. and thus the cross-links are too close together, a close-meshed and thus hard, inflexible polymer is produced. On the other hand if the polymer is of too high mol. wt. and/or too highly cross-linked its solubility in toluene will be low and, also, it will not penetrate the pores of the paper well. If too few reactive groups remain in the pre-polymer, there will be insufficient anchorage to the paper. Example 8 shows the unsatisfactory result of using a polyol of too high mol. wt. where there are too few cross-links to give a satisfactory product.

If less than about 2 equivalents of isocyanate (herein sometimes designated NCO) are reacted with 1 equivalent of hydroxyl (less than 2 mols of NCO per mol diol or less than 3 mols NCO per mol triol) a chain extension occurs which, for the present purposes, is undesirable in the pre-polymer formation since too large a molecule is formed with too few NCO groups to obtain good anchorage to the paper and too little crosslinking (a wide-meshed final polymer) to give a strongly bonded final product. On the other hand, if more than about 2½ equivalents NCO are reacted per equivalent of OH in the polyol and the reaction is carried too far, too large a pre-polymer molecule is likewise formed because, in this case, the excess of fast-reacting, unhindered NCO groups react with even the less reactive active hydrogen of the urethane groups to form an allophanate. The most desirable procedure is to use a polyisocyanate that contains NCO groups of different reactivities, for example, in 2,4 tolylene diisocyanate where the NCO group in the 2 position is sterically hindered by the neighboring methyl group. And I have discovered that these 2 NCO groups are of sufficiently different reactivity to be of practical importance in permitting the more reactive groups to be largely used up in pre-polymer formation, leaving a much less reactive group that does not react rapidly when the pre-polymer is held at room temperature while it is being used or held for use, but after adding catalyst and spreading on a backing reacts rapidly when the coated or impregnated web is heated. The less reactive NCO thus is present to bond the polymer to the active hydrogen in the backing. However, since the pure 2,4 isomer of TDI is expensive, in practice I have found that a compromise can be made so that a practically useful application of this differing reactivity can be made. Apparently others have not realized that sufficient difference in reactivity existed to result in this procedure's permitting such a pre-polymer as I use to have sufficient life to avoid marked increase in viscosity of the pre-polymer solution while it is in use. Such differing reactivity of different NCO groups also occurs in other polyisocyanates as in certain isomeric diisocyanates of ethyl benzene, xylene, bitolylene, methyl diphenyl methane, dimethyl diphenyl methane, dianisidine and others. Also the presence of other neighboring groups such as chlorine, *enhance* the reactivity of the NCO group. At the present time, however, the 2,4 tolylene diisocyanate is the cheapest and most readily available and the difference between the reactivities of the 2 and 4 position NCO groups I have shown to be sufficient in reacting with the types of polyols I use, to be of practical value.

In addition I have made a further improvement in my impregnating process as follows. With my above procedures, while they have been very useful, there is still a limit to the life of my pre-polymer solution and there is an occasional complaint of a slightly undesirable stiffness in the finished impregnated paper. I again make my pre-polymers with the same polyols but use from 80 to 100% of the stoichiometric amount of TDI relative to OH equivalents—preferably 90%—and I react the polyol and TDI for up to about 4 hours at 100° C. and analyze to assure that no free NCO groups remain in the pre-polymer. Pre-polymer made in this way has a very long life, often can be held many weeks without increase in viscosity. This pre-polymer is then dissolved in a solvent such as toluene or a mixture of volatile aromatic and aliphatic solvent such as toluene and heptane, to a solution of about 50 wt. percent solids. I then add from 1 to 6% of the weight of pre-polymer of stannous octoate catalyst plus from 10 to 100% of the weight of stannous octoate, of triethyl amine and an amount of the bis phenol adduct of methylene bis (4-phenylisocyanate) in amount such that the ratio of *total* equivalents of NCO:OH which have been added to the final mix is from 1:1 to 1.5:1. The mix is still very stable at ordinary temperature. The paper is then impregnated as before but the final drying-out of solvent and curing takes only about 30 seconds at 300 to 320° F. and yields a uniformly flexible product of excellent wet and dry strength and delamination resistance. If the final proportion of NCO:OH is less than 1:1, the pre-polymer thins out on aging; if over 1.5:1, the final impregnated paper is too stiff. An example of my improved method is as follows.

EXAMPLE 9

20 lbs. of the triol of Example 1 and 3½ lbs. of TDI are reacted for 3 hrs. at 100° C. The product is dissolved in 30 lbs. toluene. To this solution are added 1½ lbs. of the previously mentioned bis phenol adduct of methylene bis (4-phenylisocyanate) or diphenylmethane-4,4'-diisocyanate and 540 grams of stannous octoate catalyst plus 54 grams triethyl amine. This mix is coated on paper as before and heated at 300 to 320° F. for about 30 seconds. The product is similar to that of Examples 2 and 3 but is more flexible.

It is to be noted that the pre-polymer procedure of Example 9 can be carried out using any of the isomeric tolylene, bitolylene, diphenyl methane, dimethyl-diphenyl methane, phenylene, triphenyl methane, hexamethylene, diphenylxenylene, xenylene, dichloroxenylene or dianisidine di- or triisocyanates, although I prefer one of or a mixture of the isomeric tolylene diisocyanates.

In the procedure of Example 9, other polyols and mixtures of them can be used as before in my earlier methods. In place of the phenol adduct I may use the organic polyisocyanate adducts of the enol forms of acetoacetic ester, acetomalonic ester, acetyl acetone, benzoyl acetone and acetyl acetaldehyde. Also the dimer of 2,4 tolylene diisocyanate may be used. These isocyanates are classified (see Dombrow, loc. cit., pp. 26, 27, 28) as isocyanate precursors or isocyanate generators. While the phenol adduct must be heated to about 300 to 320° F. to quickly release the NCO in the presence of an active catalyst, the other adducts can be used at lower temperatures, for example, the adduct of acetomalonic ester can be used at about 250° F.

In place of the polyols already described, I may use the liquid hydroxylated elastomers of which the following are typical: (1) styrene-butadiene copolymer, 15 to 20% styrene (preferably 20%), hydroxyl number 42, 60% trans, 20% cis(1–4), 20% vinyl (1–2), viscosity 295 poises at 30° C., 7.6 lbs./gallon, iodine number 335; (2) acrylonitrile-butadiene copolymer, 10 to 20% acrylonitrile (preferably 15%), hydroxyl number 39, 60% trans, 20% cis(1-4), 20% vinyl (1–2), viscosity 500 poises at 30° C., 7.7 lbs./gal., iodine number 345; (3) polybutadiene, hydroxyl number 45, viscosity 200 poises at 30° C., 7.5 lbs./gal., iodine number 355, 60% trans, 20% cis(1–4), 20% vinyl (1–2). The hydroxyl numbers may vary between 20 and 60, although I prefer those given above. The proportions of trans, cis and vinyl may vary from 57 to 63, 19 to 21 and 19 to 21, respectively. The viscosities may vary plus or minus 5% and the iodine numbers plus or minus 5%. These hydroxylated elastomers may also be used in mixtures of any proportions with the above described polyols.

As catalysts for the procedures of Examples 1–8, I may use any of the stannous or stannic tin catalysts such as those of Britain and Gemeinhardt, U.S. Pat. No. 3,397,158 (1) stannous octoate; (2) stannous oleate; (3) catalyst (1) or (2) mixed with a tertiary amine; (4) a stannous salt of an acid having 1 to 22 carbon atoms per molecule; (5) the catalyst (4) mixed with a tertiary amine; (6) the stannic compounds of Hostettler and Cox, U.S. Pat. No. 3,392,128 such as dibutyl tin dilaurate and other organic acid salts of stannic tin; (7) stannous octoate of Hostettler and Cox, U.S. Pat. No. 3,398,106; (8) stannous neodecanoate. However, in these procedures I prefer stannous octoate or stannous neodecanoate since these give a rapid cure, while addition of 10 to 100% of the weight of the stannic or stannous tin catalysts enumerated, of a tertiary amine yields a still more rapid cure. In place of the tertiary amine, I may use a primary or secondary amine if there is sufficient isocyanate to react with their active hydrogen.

While the stannous and stannic tin catalysts enumerated above may be used with the method of Example 9 if sufficient time and sufficiently high temperature is used in the cure, I prefer the use of 10 to 100% of their weight of tertiary amine to be added to these tin catalysts in order to obtain a very fast and complete cure so that the material in the impregnant and the backing is not subjected to too high a temperature for too long a time and the whole process is speeded up for the sake of economy. In this case, also, a primary or secondary amine can be used in place of the tertiary amine if additional isocyanate is added to react with the active hydrogen in the primary and secondary amine groups. The use of *tertiary* amine with *stannous* tin catalysts is disclosed by Britain and Gemeinhardt (loc. cit.). But it is herein disclosed that tertiary amines have a synergistic catalytic action with the stannic tin catalysts enumerated and, furthermore, primary and secondary amines have a synergistic catalytic action with *both* stannous and stannic tin catalysts. Especially effective stannic tin catalysts in this connection are dibutyl tin dilaurate, dibutyl tin diacetate, dioctyl tin diacetate and dibutyl tin maleate. These mixtures of stannous and stannic tin catalysts with primary, secondary or tertiary amines permit of a complete cure in my procedures, even using stable isocyanate precursors or adducts, in a matter of seconds as compared with minutes using the most active tin catalysts without amines. While I have indicated the proportion of amine to tin catalyst can vary from 10 to 100% of the weight of the stannous or stannic tin catalyst, I prefer 10%, and the proportion of tin catalyst I use is from 1 to 6% of the weight of polyurethane polymer.

Other catalysts that can be used are lead naphthenate, cobalt naphthenate, phenyl mercuric acetate and bismuth naphthenate—although these are less active and can best be used with 10 to 100% of their weight of amine, as described. The amines, alone, have slight catalytic action as compared even with the tin catalysts alone and the combination of tin catalyst and amine has far greater activity that the sum of the activities of both tin and amine catalysts, thus showing marked synergism. Suitable amines of the tertiary type to use in combination with tin catalysts are trimethyl, triethyl, tripropyl and tributyl amines (preferably triethyl), N-methyl morpholine, N-ethyl morpholine, triethylene diamine and others. Presumably it is only necessary to use an amine to impart a slight alkalinity to the impregnating solution.

It is to be noted that my type of process becomes undesirably costly when the final cure requires more than 3 to 4 minutes heating and if the heating temperature is about 320° or higher deterioration of the product may set in if the heating time required is more than about 1 minute. Thus as a practical matter I am limited in the methods illustrated by Examples 1–8 to catalysts at least as active as dibutyl tin dilaurate and preferably stannous octoate and stannous neodecanoate or, still better, these catalysts with 10 to 100% of their weight of the amines disclosed. In the case where isocyanate precursors are used, as in Example 9, it is highly desirable to use catalysts of at least the activity of dibutyl tin dilaurate, dibutyl tin diacetate, dioctyl tin diacetate, dibutyl tin maleate, stannous octoate and stannous neodecanoate *mixed* with 10 to 100% of their weight of amine, preferably the tertiary amines disclosed hereinbefore. Too inactive catalysts not only add to cost by slowing down the process but, as stated, the increased time at the higher temperatures required for cure, may result in deterioration of the product.

In general pre-polymers suitable for my use are soluble in toluene—in contrast to those used for coating—and do not require the more powerful solvents like esters, ketones and polyfunctional solvents. As a matter of fact the present prepolymers are soluble in benzene, toluene, xylene and mixtures of these and even in these aromatic solvents diluted with up to 30 wt. percent of volatile, liquid aliphatic, alicyclic and naphthenic hydrocarbons—heptane being one of the most useful of the latter. While other solvents than used in my examples and mentioned above are suitable (for example, the acetate of the monomethyl, monoethyl or monobutyl ether of ethylene glycol, ethyl acetate, ethers and ketones like methyl-ethyl ketone) the solvent must be essentially inert in that it does not react with isocyanate groups or with the polyols. Usually, however, toluene or a mixture of it with up to 30 wt. percent heptane is preferred because of cheapness and suitable volatility. The solvent should have a normal boiling-point of less than about 175° C. and preferably below 120° C. The concentration of pre-polymers in the impregnating solution can vary from about 20 to 80 wt. percent and is usually about 40 to 50%; but even the pure polymers can be used in case they are liquid. The proportion of polyurethane polymers in the finished product can vary from about 20 to about 80% of the weight of the original substrate, depending upon requirements.

In general the preference of the present invention is for use of the polyhydroxy ethers (substituted or unsubstituted polyalkylene ether glycols or polyhydroxy polyalkalene ethers) although polyhydroxy polyesters or a proportion of vegetable oils such as castor oil can be used. However the polyesters are usually more costly and tend to yield a final product of somewhat inferior flexibility and castor oil is of a lower order of reactivity with isocyanates. Ethylene or propylene oxide adducts of polyols are relatively cheap and very satisfactory when selected as herein described.

The polyol used must have a molecular weight in the range from about 400 to about 4400 but must have an average molecular weight between about 800 and about 3500 and preferably between 1000 and 3200. Thus, if a polyol of mol. wt. 400 is used, it must be mixed with sufficient polyol of higher mol. wt. to bring the average of the mixture up to at least about 800, but, of course, not above 3500. Likewise if a polyol of mol. wt. 4400 is to be used, it must be mixed with sufficient lower mol. wt. polyol to bring the average of the mixture down to at least 3500, but not below about 800. Pre-polymers best adapted to my use are all soluble in toluene at least to the extent of 10% by weight and even to as high as 80%; moreover the present pre-polymers are normally soluble in toluene containing up to about 30 wt. percent heptane. These solubilities characterize my pre-polymers and distinguish them from polyurethane polymers used by others. For use as pressure-sensitive adhesive tape backing, paper when impregnated with my polymers and dried should preferably contain about 40 to 80% of its weight of total solid impregnants.

What is claimed is:

1. A permeable substrate containing active hydrogen attached through urethane linkages to from 20 to 80% of its weight of a urethane pre-polymer product of the reaction of at least substantially all of the more reactive isocyanate groups but not all of the less reactive isocyanate groups of at least one organic, aromatic polyisocyanate selected from the class consisting of tolylene diisocyanates, and polyisocyanates of ethyl benzene, xylene, bitolylene, methyl diphenyl methane, dimethyl diphenyl methane and dianisidine, with a polyol in the proportion of 1.8 to 2.5 equivalents of isocyanate per equivalent of hydroxyl, said polyol being selected from the class consisting of polyols of molecular weight in the range from about 800 to about 3500 and mixtures of polyols of molecular weight from about 400 to about 4400 said mixtures having average molecular weights in the range from about 800 to about 3500; said pre-polymer being attached to said substrate by urethane linkages through the seat of said active hydrogen and said isocyanate groups being completely reacted in the presence of 1 to 6% of the weight of said pre-polymer, of at least one catalyst selected from the class consisting of: (a) stannous salts of organic acids with from 1 to 22 carbon atoms per molecule; (b) dibutyl tin dilaurate, dibutyl tin diacetate, dioctyl tin diacetate and dibutyl tin maleate; and (c) the catalysts of (a) and (b) mixed with from 10 to 100% of their weight of a tertiary amine selected from the class consisting of trimethyl-, triethyl-, tripropyl- and tributyl-amine, N-methyl morpholine, N-ethyl morpholine and triethylene diamine.

2. The product of claim 1 wherein the said catalyst contained therein is one characterized by an activity at least as great as that of stannous octoate.

3. The product of claim 1 to which is added an amount of extender up to about 25% of the weight of said pre-polymer, said extender being selected from the class consisting of hydrocarbon resins of acid number below about 4 and finely divided neutral and slightly acid inert solid fillers.

4. A pressure-sensitive adhesive tape comprising the product of claim 1 as backing material wherein the said permeable substrate is paper, upon one side of which is coated a pressure-sensitive adhesive.

5. The product of claim 1 wherein for the said polyol is substituted a hydroxylated elastomer selected from the class consisting of styrene-butadiene copolymer containing 15 to 20% styrene, acrylonitrile-butadiene copolymer containing 10 to 20% acrylonitrile, and polybutadiene; said hydroxylated elastomer having a hydroxyl number from 20 to 60 and 57 to 63% trans, 19 to 21% cis(1–4) and 19 to 21% vinyl (1–2).

6. The product of claim 5 wherein for the said catalyst is substituted one characterized by an activity at least that of stannous octoate.

7. Paper impregnated with from 20 to 80% of its weight of a polyurethane polymer comprising a pre-polymer reaction-product of tolylene diisocyanate and a polyol selected from the class consisting of polyols of molecular weight in the range from about 800 to about 3500 and mixtures of polyols of molecular weight in the range from about 400 to about 4400 said mixtures having average molecular weights in the range from about 800 to about 3500, said diisocyanate being present to the extent of 0.9 equivalent of isocyanate to 1 equivalent of hydroxyl in said polyol, said pre-polymer containing substantially no unreacted isocyanate groups, said polyurethane polymer further containing an amount of the reaction-product of the phenol adduct of methylene bis(4-phenylisocyanate) and the said pre-polymer and said paper, said adduct being in amount such that the total equivalents of isocyanate to total equivalents of hydroxyl are in the ratio of from 1:1 to 1.5:1 and said impregnated paper further containing from 1 to 6% of the weight of said pre-polymer of catalyst comprising stannous octoate plus 10 to 100% of the weight of stannous octoate, of triethyl amine.

8. The product of claim 7 wherein stannous neodecanoate is substituted for the said stannous octoate.

9. The product of claim 7 wherein dibutyl tin dilaurate is substituted for the said stannous octoate.

References Cited

UNITED STATES PATENTS

| | | | |
|---|---|---|---|
| 3,248,254 | 4/1966 | Zenk | 117—60 X |
| 3,398,106 | 8/1968 | Hostettler et al. | 260—18 |
| 3,197,330 | 7/1965 | Bartell | 117—122 |
| 3,251,713 | 5/1966 | Crone | 117—122 |
| 3,297,158 | 8/1968 | Britain | 260—824 X |
| 3,012,987 | 12/1961 | Ansul | 117—132 X |
| 3,518,113 | 6/1970 | MacGugan | 117—155 |
| 2,893,898 | 7/1959 | Evans | 8—116.2 X |
| 3,410,817 | 11/1968 | McClellan et al. | 117—155 |
| 3,401,133 | 9/1968 | Grace | 117—155 X |

WILLIAM D. MARTIN, Primary Examiner

B. D. PIANALTO, Assistant Examiner

U.S. Cl. X.R.

117—122 P, 161 KP